(12) United States Patent
Seyedi

(10) Patent No.: US 12,160,307 B2
(45) Date of Patent: Dec. 3, 2024

(54) WAVELENGTH-DIVISION MULTIPLEXED LINKS WITH BUILT-IN CLOCK FORWARDING

(71) Applicant: NVIDIA Corporation, Santa Clara, CA (US)

(72) Inventor: Mir Ashkan Seyedi, Atlanta, GA (US)

(73) Assignee: NVIDIA Corporation, Santa Clara, CA (US)

( * ) Notice: Subject to any disclaimer, the term of this patent is extended or adjusted under 35 U.S.C. 154(b) by 380 days.

(21) Appl. No.: 17/739,681

(22) Filed: May 9, 2022

(65) Prior Publication Data

US 2023/0361905 A1  Nov. 9, 2023

(51) Int. Cl.
*H04J 14/08* (2006.01)

(52) U.S. Cl.
CPC .................................. *H04J 14/08* (2013.01)

(58) Field of Classification Search
None
See application file for complete search history.

(56) References Cited

U.S. PATENT DOCUMENTS

| 6,282,005 | B1* | 8/2001 | Thompson | H04B 10/58 359/254 |
| 2012/0082448 | A1* | 4/2012 | Bouda | H04J 14/0221 398/5 |
| 2016/0315758 | A1* | 10/2016 | Pelekhaty | H04B 10/40 |

* cited by examiner

*Primary Examiner* — David W Lambert
(74) *Attorney, Agent, or Firm* — Lowenstein Sandler LLP

(57) ABSTRACT

A system can include an optical transmitter having transmitter components and an optical receiver having receiver components and photodetectors. The optical transmitter is configured to receive optical wavelengths of radiation from a multiple wavelength generate, such as a laser, and generate transmitted wavelengths including data wavelengths and excess wavelengths. Each photodetector is configured to receive at least one transmitted wavelength. The photodetectors can include a common photodetector operatively coupled to at least two receiver components and configured to obtain a set of unmodulated carrier frequencies (e.g., a pair of unmodulated carrier frequencies) from the at least two receiver components, and determine clock information therefrom. The clock information can be determined by obtaining a heterodyne frequency from the set of unmodulated carrier frequencies. The heterodyne frequency can be used to synchronize the optical transmitter and the optical receiver.

20 Claims, 6 Drawing Sheets

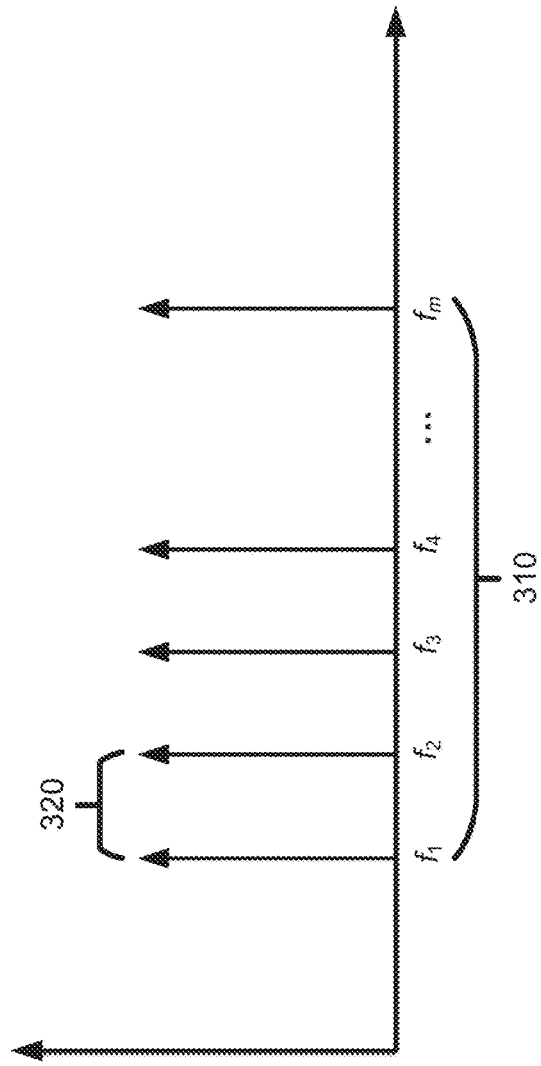

WAVELENGTH-DIVISION MULTIPLEXED LINKS WITH BUILT-IN CLOCK FORWARDING

TECHNICAL FIELD

At least one embodiment pertains to processing resources used to perform and facilitate high-speed communications. For example, at least one embodiment pertains to technology for wavelength-division multiplexed links with built-in clock forwarding.

BACKGROUND

Communication systems transmit signals from a transmitter to a receiver via a communication channel or medium (e.g., cables, printed circuit boards, links, wirelessly, etc.). For example, the transmitter can use serial communication to transmit serial data within a serial data stream to the receiver via a serial communication channel (e.g., data sent sequentially on a per-bit basis over a single channel). As another example, the transmitter can use parallel communication to transmit parallel data within a parallel data stream to the receiver via the communication channel (i.e., multiple bits of data sent simultaneously via respective channels). Data can be encoded within a carrier wave or signal using a modulation technique. One example of a modulation technique is frequency modulation, which encodes data within a carrier signal by varying the frequency of the carrier signal. To do so, a modulator can combine the carrier signal with a data signal (i.e., baseband signal) to generate a modulated signal.

BRIEF DESCRIPTION OF DRAWINGS

Various embodiments in accordance with the present disclosure will be described with reference to the drawings, in which:

FIG. 2 illustrates an example communication system implementing wavelength-division multiplex links with built-in clock forwarding, in accordance with at least some embodiments;

FIG. 3 illustrates an example diagram illustrating an output of a multiple wavelength generator, in accordance with at least some embodiments;

DETAILED DESCRIPTION

Figure 1:
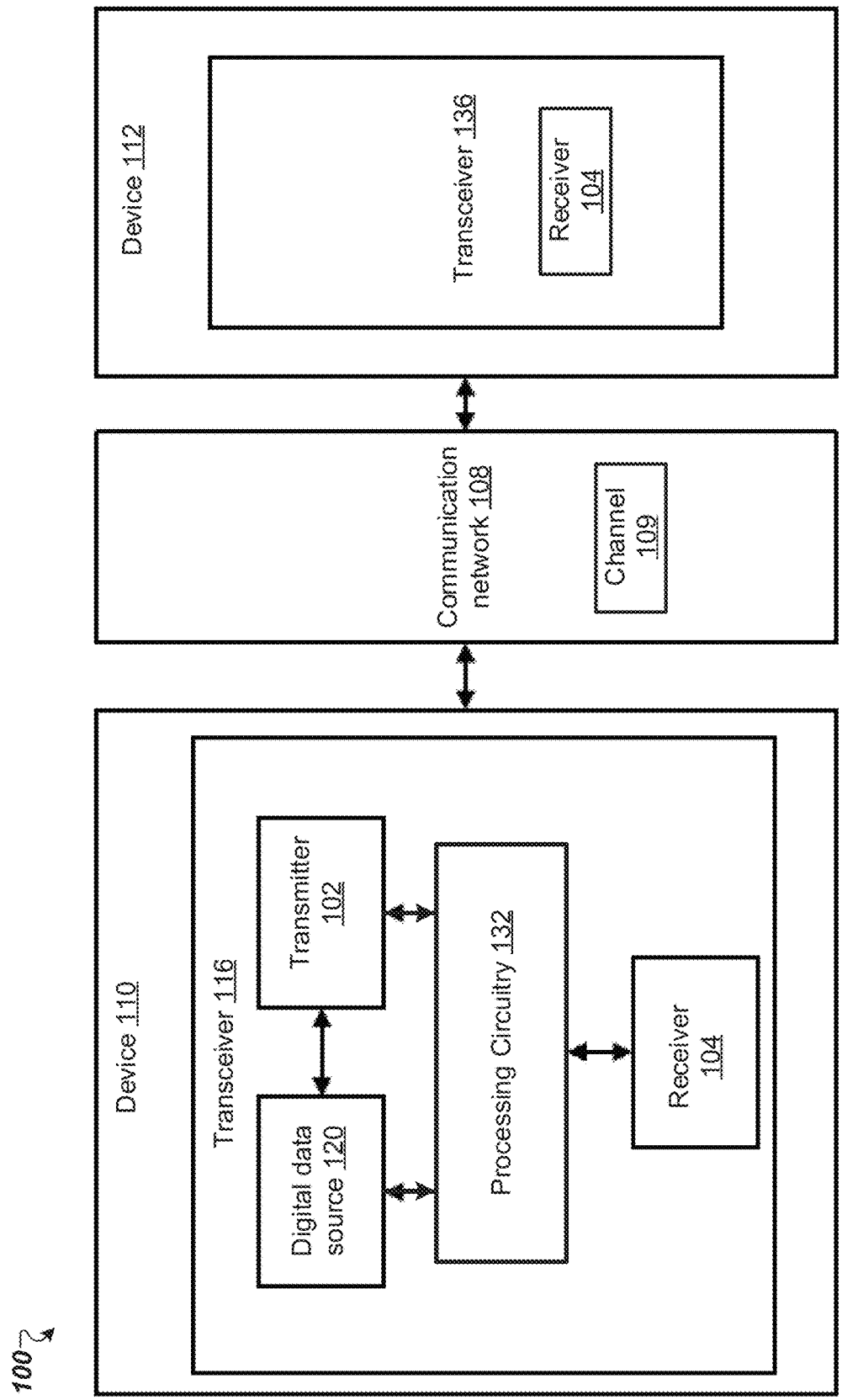
FIG. 1 is an example communication system, in accordance with at least some embodiments.

Data (e.g., serial data) can be sent from a transmitter to a receiver via a communication channel as a series of pulses with well-defined timing constraints. If the local clock of the receiver is not appropriately synchronized with the transmitter, then the receiver may incorrectly decode the data since the receiver may sample the signal at the wrong time. Synchronization can be achieved using auxiliary clock information obtained from clock systems. Clock systems can range from highly accurate, but expensive and complex clock systems (e.g., atomic clocks), to cheaper, but less accurate, clock systems that suffer from drift effects (e.g., quartz oscillators). For example, although such less accurate clock systems may be sufficiently accurate over short periods of time, drift can add up over a period of time (e.g., minutes or hours), eventually rendering the timing too inaccurate for many applications.

Instead of using the clock systems described above, clock recovery can achieve synchronization without using the auxiliary clock information as described above. Clock recovery generally involves embedding clock information related to the transmitter's clock timing into a data stream itself (e.g., serial data stream), and then extracting the clock information from a data stream at the receiver. The clock information embedded within the data stream can include short clock signals inserted into the data stream that can be seen and then used in an oscillator (e.g., phase-locked loop) to generate a local clock signal that can be used to time the signal in the periods between the clock signals. Accordingly, drift in the transmitter's clock can be addressed as the receiver will match the drift, as long as the drift is sufficiently small.

One method of clock recovery can rely on self-latching clock recovery circuitry, which identifies a clock signal by analyzing a photocurrent generated from a (modulated) carrier wave. For example, the embedded data signal within the modulated carrier wave can be transmitted on a regular cadence to enable synchronization of the transmitter clock to the receiver clock. However, using the self-latching clock recovery circuitry can require ingestion of multiple data bits for aligning the clock, and only then can the received data be correctly transformed from analog signals to digital signals. Such methods can result in a waste in bandwidth since the bits that are used to perform clock recovery are not usable for data transmission, increased chip area consumption, increased power consumption due to the associated circuits required, and increased latency.

For example, assume that a data packet has a size of 128 bits and the first 10 bits of the data packet are used to perform clock recovery. Since the first 10 bits of the data packet will be used to perform clock recovery, data may not be embedded within those first 10 bits of the data packet. Thus, less information is sent via the data packet than is theoretically possible (i.e., resulting in a decrease in bandwidth). Moreover, if each bit has an associated time of one nanosecond, then it can take 10 nanoseconds to perform clock recovery (i.e., resulting in an increase in latency).

Aspects of the present disclosure can address the deficiencies above and other challenges by implementing wavelength-division multiplexed optical links ("links") with built-in clock forwarding. In wavelength-division multiplexing, multiple wavelengths (or frequencies) generated by a multiple wavelength generator (e.g., laser) can be transmitted via a single optical channel (e.g., fiber). Each wavelength has a respective carrier frequency. Each of the carrier frequencies can be separated by a frequency spacing (e.g., a fixed frequency spacing), which can be set based on the structure and/or geometry of the multiple wavelength generator. The frequency spacing can be chosen to have a suitable size to accommodate error-free communication. For example, the frequency spacing can be chosen to have a size large enough prevent cross talk between frequencies/wavelengths, but not overly large so as not to waste bandwidth.

In some embodiments, the magnitude of the frequency spacing is a function of the data transfer rate.

In some embodiments, the multiple wavelengths are generated by a multiple wavelength generator operating in the original band ("O-band"), in which the wavelengths can range between about 1260 nanometers (nm) to about 1310 nm (carrier frequencies of between about 220 terahertz (THz) to about 250 THz). In some embodiments, the multiple wavelengths are generated by a multiple wavelength generator operating in the conventional band ("C-band", in which the wavelengths can range between about 1530 nm to about 1565 nm (carrier frequencies of between about 190 THz to about 195 THz). Other wavelengths are also possible. In some embodiments, the data embedded by modulating carrier frequencies can have frequencies on the order of GHz. Illustratively, if the data transfer rate is between 10 gigabits per second (Gbps) to about 200 Gbps, then the frequency spacing can be between about 20 GHz to about 400 GHz (e.g., a magnitude of about twice the magnitude of the data transfer rate).

A portion of the wavelengths generated by the multiple wavelength generator can be used to derive clock information for synchronizing a transmitter (e.g., optical transmitter) and a receiver (e.g., optical receiver). For example, a portion of the wavelengths (e.g., a pair of wavelengths) received by the transmitter can be designated as "excess wavelengths" having carrier frequencies that remain unmodulated by the transmitter, and thus do not have data embedded or carried therein for transmission to the receiver. After receiving transmitted wavelengths including the excess wavelengths from the transmitter, the receiver can obtain heterodyne signal as a result of interference between the excess wavelengths. Clock information for synchronizing the transmitter and the receiver can then be derived from the heterodyne signal.

For example, the transmitter can receive the multiple wavelengths. The transmitter can include a number of transmitter components each tuned to a respective carrier frequency. The number of transmitter components can be less than the number of wavelengths in some embodiments. In some embodiments, the multiple wavelengths can include a number of data wavelengths (i.e., "in-bound" wavelengths) to which data can be embedded or carried via modulation (e.g., frequency modulation) by respective transmitter components, and a number of excess wavelengths (i.e., "out-of-bound" wavelengths) that remain unmodulated. That is, an excess or out-of-bound wavelength is a wavelength that is not intended for data transmission. For example, assume that there are n total data wavelengths being used. There can be at least one pair of excess wavelengths, an (n+1)-th wavelength and an (n+2)-th wavelength, each having a respective carrier frequency unmodulated by a transmitter component ("unmodulated carrier frequency").

The transmitter can transmit the data wavelengths and the excess wavelengths as transmitted wavelengths to a receiver. The receiver can include a number of receiver components (e.g. filters) and a number of photodetectors or photosensors, where each of the receiver components is operatively coupled to a photodetector. A photodetector is an optoelectronic device that can convert electromagnetic radiation (e.g., light) into an electrical signal (i.e., current or photocurrent). For example, each photodetector can extract a respective photocurrent from at least one incident carrier frequency. The photocurrent can include an alternating current (AC) component and/or a direct current (DC) component. In some embodiments, the AC component of the photocurrent is represented by a sine wave having a frequency determined from the at least one incident carrier frequency.

In some embodiments, the at least two excess wavelengths (e.g. the pair of excess wavelengths n+1 and n+2) can be combined and impinged at a common photodetector operatively coupled to a respective pair of receiver components each tuned to receive a respective one of the out-of-bound wavelengths. The common photodetector can obtain a heterodyne signal having a heterodyne frequency, where the heterodyne frequency is a frequency that results from the difference between the unmodulated carrier frequencies (e.g., the interference pattern of the pair of out-of-bound wavelengths). For example, the heterodyne frequency can be the frequency of the AC component of the photocurrent (e.g., frequency of the resulting sine wave).

The heterodyne frequency can be a function of the frequency spacing separating the carrier frequencies, and thus the frequency spacing between at least two excess wavelengths. In some embodiments, the heterodyne frequency is the frequency spacing between the at least two out-of-bound wavelengths. In some embodiments, the heterodyne frequency is a multiple (e.g., octave) of the frequency spacing between at least two excess wavelengths. The heterodyne frequency can be forwarded to the other photodetectors and/or otherwise used as clock information for synchronizing the receiver clock with respect to the transmitter clock. Further details regarding implementing wavelength-division multiplex links with built-in clock forwarding will be described below with reference to FIGS. 1-6.

By enabling clock forwarding described herein, embodiments described herein can remove the need to embed and recover the clock information from the data stream. Since the clock information is contained in out-of-bound wavelengths that do not carry data, bandwidth for data carrying wavelengths is not needed to carry clock information, resulting in the increased bandwidth. The clock recovery described herein can be accomplished without the use of additional or complex circuitry, which can reduce the cost of implementing clock synchronization between a transmitter and receiver. Moreover, since the magnitude of the frequency spacing can be at least twice the date rate, embodiments described herein can be used to enable a "fast" or "high-speed" clock in which the recovered clock is at least twice as fast as the data transfer rate of the incoming data. Accordingly, as compared to typical clock recovery techniques, embodiments described herein can achieve reduced complexity in circuitry design (e.g., decreased chip area consumption), decreased power consumption and latency, and increased bandwidth.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In one example, devices 110 and 112 may correspond to network devices such as switches, network adapters, or data processing units (DPUs).

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of device 110 and 112 may include suitable hardware and/or software for receiving signals, such as data signals from the communication network 108. For example, the receiver 104 may include components for receiving processing signals to extract the data for storing in a memory, as described in detail below with respect to FIGS. 2-6.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

In some examples, the processing circuitry 132 can facilitate a method to implement wavelength-division multiplexed links with built-in clock forwarding. For example, the processing circuitry 132 can use a heterodyne signal obtained by a receiver to set a clock for synchronizing incoming data, as described with reference to FIGS. 2-6.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

FIG. 2 illustrates an example communication system 200 according to at least one example embodiment. The system 200 can be used to implement a wavelength-division multiplexing (WDM) link. For example, the system 200 can include a multiple wavelength generator 210. The multiple wavelength generator 210 can generate an output including multiple wavelengths, where each wavelength corresponds to respective carrier frequency. The carrier frequencies can have a particular order of magnitude. In some embodiments, the carrier frequencies have a terahertz (THz) order of magnitude. At least a portion of the carrier frequencies can be modulated using frequency modulation to embed a data signal therein. Each data signal can have a data signal frequency having a particular order of magnitude that may be less than the order of magnitude of the carrier frequencies. In some embodiments, the data signal frequency has a gigahertz (GHz) order of magnitude.

The carrier frequencies can be spaced in accordance with a frequency spacing (e.g., fixed frequency spacing) or channel spacing. The frequency spacing defines a frequency separation between adjacent or consecutive carrier frequencies. The frequency spacing can be chosen to have a suitable size to accommodate error-free communication. For example, the frequency spacing can be chosen to have a size large enough prevent cross talk, but not overly large so as not to waste bandwidth. In some embodiments, the magnitude of the frequency spacing is a function of the data transfer rate. For example, the minimum magnitude of the frequency spacing can be about twice the data transfer rate. The frequency spacing can be set based on the structure and/or geometry of the optical signal generator 210.

In some embodiments, the multiple wavelength generator 210 operates in at least one of the O-band or the C-band. For example, the multiple wavelength generator 210 can operate in the O-band to generate wavelengths that range between about 1260 nm to about 1310 nm and/or the C-band to generate wavelengths that range between about 1530 nm to about 1565 nm. Accordingly, the multiple wavelength generator 210 can generate wavelengths that range from about 1260 nm to about 1565 nm. The multiple wavelength generator 210 may also operate in other bands and/or generate other wavelengths. In some embodiments, the multiple wavelength generator 210 includes a laser to generate the multiple wavelengths.

For example, the multiple wavelength generator 210 can include a set of laser chips, in which each laser chip of the set of laser chips has a respective temperature control system for generating a respective wavelength. For example, wavelength can move about 0.1 nm per about 1 degree Celsius. The set of laser chips can be operatively coupled to an optical multiplexer configured to transmit each of the wavelengths within a single optical channel (e.g., fiber).

As another example, the multiple wavelength generator 210 can include a mode-locked laser (MLL). An MLL can generate multiple wavelengths (or frequencies) of light by exploiting interference between longitudinal modes using an optical cavity (i.e., resonant cavity) of the laser. For example, the optical cavity can include a number of mirrors from which light generated by the laser reflects off of, which enables the light to interfere with itself (constructively and/or destructively). The interference results in the generation of standing waves having respective frequencies. Adjacent ones of the frequencies can be separated by a frequency spacing defined based on the structure and/or geometry of the optical cavity. For example, the frequency spacing can be defined based on the distance between the mirrors within the optical cavity ("mirror separation"). The frequency spacing, $\Delta f$, can be inversely proportional to the mirror separation. In some embodiments, $$\Delta f = \frac{c}{2L},$$

where c is the speed of light and L is the mirror separation. The MLL implementation may be preferable as compared to the laser chip implementation due to the lack of need for temperature control. Further details regarding the multi-frequency optical signal generated by the multiple wavelength generator 210 will now be described below with reference to FIG. 3.

FIG. 3 illustrates an example diagram 300 illustrating an output of a multiple wavelength generator, according to at least one example embodiment. For example, the multiple wavelength generator can be the multiple wavelength generator 210 of FIG. 2. In some embodiments, the multiple wavelength generator is a laser. For example, the laser can include a laser module that can generate the output.

The diagram 300 shows the output of the multiple wavelength generator including a set of carrier frequencies 310. The set of carrier frequencies 310 can include m total carrier frequencies $f_1$ through $f_m$. In this illustrative example, the set of carrier frequencies is generated at a fixed frequency spacing 320 ($\Delta f$), in which adjacent or consecutive frequencies are separated by the same frequency spacing 320 (i.e., $\Delta f = f_2 - f_1 = f_3 - f_2 = \ldots = f_m - f_{m-1}$). In some embodiments, the frequency spacing 320 has a value between about 25 GHz to about 200 GHz. For example, if $f_1 = 220$ THz and the frequency spacing 320 is 200 GHz (0.2 THz), then the set of carrier frequencies 310 can include $f_1 = 220$ THz, $f_2 = 220.2$ THz, $f_3 = 220.4$ THZ, etc.

Typically, each carrier frequency of set of carrier frequencies 310 is aligned to a spectrally sensitive modulator (e.g., a ring resonator cavity) that will modulate a data signal onto the carrier frequency (i.e., embed data therein). The data signal can be a high-speed data signal. In some embodiments, the data transfer rate can be between about 10 Gbps to about 100 Gbps. In some embodiments, each carrier frequency of the set of carrier frequencies 310 can have a value about three orders of magnitude greater than the frequency of the data signal. For example, if the carrier frequencies have a THz order of magnitude, then the data signal frequencies can have a GHz order of magnitude.

Referring back to FIG. 2, the system can further include a transmitter 220 operatively coupled to the optical signal generator 210, and a receiver 230 operatively coupled to the transmitter 220. As will be described in further detail below with reference to FIG. 4, the transmitter 220 can include a number of transmitter components each being tuned to receive and transmit a respective one of the wavelengths to the receiver 230, and the receiver 230 can include a number of receiver components (e.g., filters) each being tuned to receive a respective one of the transmitted wavelengths. The receiver 230 can further include a number of photodetectors, where each photodetector is operatively coupled to at least one of the receiver components. For example, the receiver components can include a pair of receiver components tuned to receive a pair of out-of-band wavelengths, and combine the wavelengths at a common photodetector to obtain a heterodyne signal having a heterodyne frequency. The heterodyne frequency can be calculated as the difference or interference pattern between the unmodulated carrier frequencies. In some embodiments, the heterodyne frequency can be sent as clock information to the other photodetectors and/or other components of receiver 230 to synchronize the receiver 230 with the transmitter 220.

Figure 4:
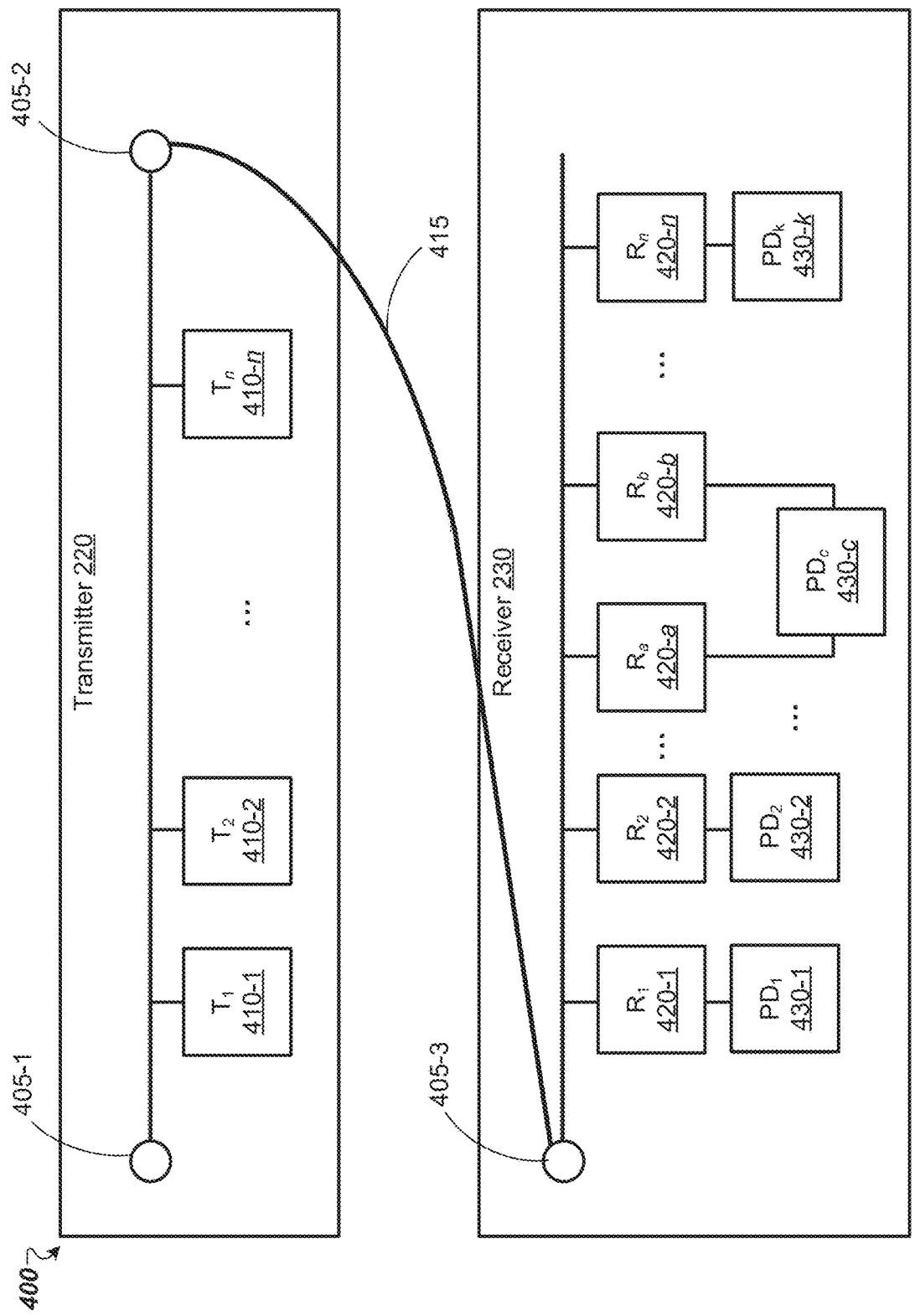
FIG. 4 is an example communication system implementing wavelength-division multiplex links with built-in clock forwarding, in accordance with at least some embodiments.

FIG. 4 illustrates an example communication system 400 implementing wavelength-division multiplexed links with built-in clock forwarding, according to at least one example embodiment. In at least one embodiment, communication system 400 includes a portion of the communication system 200 as described above with reference to FIG. 2. For example, as shown, the communication system 400 includes the transmitter 220 and the receiver 230.

The transmitter 220 can include a node 405-1 corresponding to an input for receiving carrier waves generated by a multiple wavelength generator. For example, the multiple wavelength generator can be the multiple wavelength generator 210 of FIG. 2 (e.g., a laser). The multiple wavelength generator can generate multiple wavelengths, where each wavelength corresponds to a carrier frequency. Thus, the multiple wavelength generator 210 can generate m carrier frequencies $f_1$ through $f_m$, as described above with reference to FIG. 3.

The multiple wavelength generator can generate the multiple wavelengths such that adjacent or consecutive carrier frequencies are separated by a fixed frequency spacing $\Delta f$. For example, $\Delta f = f_2 - f_1 = f_3 - f_2 = \ldots = f_m - f_{m-1}$. The frequency spacing can be defined by the structure and/or geometry of the multiple wavelength generator, as described above with reference to FIGS. 2-3. For example, the frequency spacing can have a minimum magnitude of about twice the data transfer rate. However, the frequency spacing can have any suitable magnitude in accordance with embodiments described herein.

The transmitter 220 can further include a set of transmitter components $T_1$ 410-1 through $T_N$ 410-n. Each of the transmitter components $T_1$ 410-1 through $T_1$ 410-n can be tuned to a respective one of the carrier frequencies to generate a respective modulated carrier frequency. Each modulated carrier frequency includes data embedded within the carrier frequency for data transmission. At least two of the carrier frequencies $f_1$ through $f_m$ remain unmodulated, such that they do not include embedded data for data transmission (i.e., m>n). Thus, the transmitted carrier frequencies can include n modulated carrier frequencies and a set of unmodulated carrier frequencies (e.g., at least one pair of unmodulated carrier frequencies). For example, if m−n=2, then there are two unmodulated carrier frequencies forming a single pair of unmodulated carrier frequencies. In some embodiments, the transmitter 220 is configured to output a set of excess wavelengths with unmodulated carrier frequencies that together carry clock information. The set of excess wavelengths are usable to obtain a heterodyne frequency that functions as a clock signal in embodiments.

The transmitter 220 can further include a node 405-2 corresponding to an output for transmitting the transmitted wavelengths/carrier frequencies, and the receiver can include a node 405-3 correspond to an input for receiving the transmitted wavelengths/carrier frequencies. The transmitted carrier frequencies can be transmitted from the transmitter 220 to the receiver 230 via an optical channel 415. In some embodiments, the optical channel 415 is a fiber optic channel.

The receiver 230 can further include a set of receiver components (e.g., filters) $R_1$ 420-1 through $R_n$ 420-n. Each of the receiver components 420-1 through 420-n is tuned to a respective one of the transmitted wavelengths/carrier frequencies. The receiver 230 can further include a number of photodetectors (PDs) $PD_1$ 430-1 through $PD_k$ 430-k. Each of the receiver components 420-1 through 420-n is operatively coupled to one of the PDs 430-1 through 430-k.

Each of the receiver components $R_1$ 420-1 through $R_n$ 420-n can route its respective transmitted wavelength/carrier frequency (including any embedded data if it is a modulated carrier frequency), to a respective one of the PDs 430-1 through 430-k. For example, as shown in FIG. 4, $R_1$ 420-1 can route its respective transmitted wavelength/carrier frequency to $PD_1$ 430-1, $R_2$ 420-2 can route its respective transmitted wavelength/carrier frequency to $PD_2$ 430-2 . . . and $R_n$ 420-n can route its respective wavelength/carrier frequency to $PD_k$ 430-k. Each of the photodetectors $PD_1$ 430-1 through $PD_k$ 430-k can extract a respective photocurrent from the transmitted wavelength/carrier frequency.

In this illustrative example, the receiver 230 includes receiver components $R_a$ 420-a and $R_b$ 420-b that route their respective transmitted wavelengths/carrier frequencies to a common photodetector, $PD_c$ 430-c. Although two receiver components are shown having a common PD, the receiver 230 can include more than two receiver components that share at least one common PD. Moreover, although receiver components $R_a$ 420-a and $R_b$ 420-b are shown as being adjacent receiver components, receiver components $R_a$ 420-a and $R_b$ 420-b can alternatively be non-adjacent receiver components.

The system 400 can support clock forwarding by using a heterodyne signal generation technique, in which at least two different transmitted wavelengths/carrier frequencies obtained from at least two receiver components are selectively combined and simultaneously (or near-simultaneously) impinged upon the at least one common photodetector to generate a heterodyne signal (e.g., via constructive and/or destructive interference. The carrier frequencies can be combined using optical components such as waveguides, optical combiners, etc. The heterodyne signal can have a heterodyne frequency resulting from interference between the unmodulated carrier frequencies. In some embodiments, the heterodyne frequency has a magnitude equal to the magnitude of the frequency spacing. In some embodiments, the heterodyne frequency has a magnitude equal to at least twice the magnitude of the frequency spacing. For example, the heterodyne frequency can have a magnitude of any suitable integer multiples (e.g., octaves) of the magnitude of the frequency spacing.

In an example, $PD_c$ 430-c can generate a photocurrent having an AC component and a DC component. The AC component can be represented by a wave (e.g., sine wave) having a heterodyne frequency defined as the determined difference between the carrier frequency received from $R_a$ 420-a and the carrier frequency received from $R_b$ 420-b. For the sake of illustration, assume that $R_a$ 420-a is tuned to select a 220 THz carrier frequency and that $R_b$ 420-b is tuned to select a 220.2 THz carrier frequency, and the frequency spacing is defined as 200 GHz. The heterodyne frequency would be 200 GHz (i.e., 220.2 THz−220 THz=0.2 THz=200 GHz). Thus, the heterodyne frequency can be used to recover the frequency spacing, which can be used to set the clock for the receiver 230 that could appropriately synchronize incoming data received from the transmitter 220. Accordingly, in this example, the magnitude of the heterodyne signal is equal to the magnitude of the frequency spacing.

As another example, assume a frequency spacing of 20 GHz, such that the carrier frequencies include 220 THz, 220.02 THz, 220.04 THz, etc. Further assume that $R_a$ 420-a is tuned to the 220 THz carrier frequency and that $R_b$ 420-b is tuned to the 220.04 THz carrier frequency. The 220.04 THz carrier frequency and the 220 THz carrier frequency can be selectively combined and impinged at $PD_c$ 430-c to generate a heterodyne signal having a heterodyne frequency of 40 GHz. Accordingly, in this example, the magnitude of the heterodyne signal is equal to twice the magnitude of the frequency spacing (i.e., one octave higher than the frequency spacing). Further details regarding heterodyne signal generation are described above with reference to FIGS. 2-4 and will now be described below with reference to FIG. 5.

Figure 5:
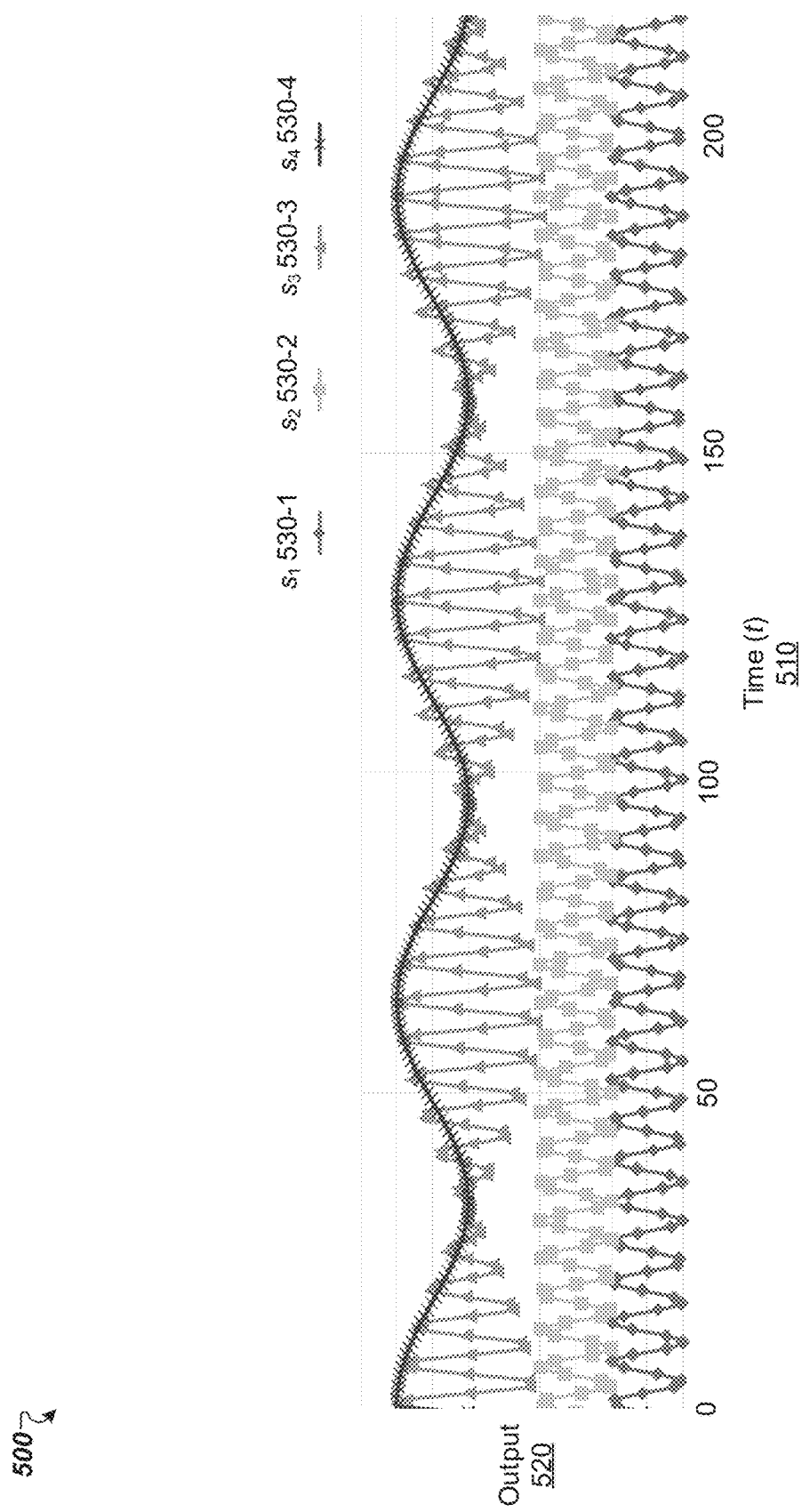
FIG. 5 is an example plot illustrating heterodyne signal generation, in accordance with at least some embodiments.

FIG. 5 illustrates an example plot 500 illustrating heterodyne signal generation, according to at least one example embodiment. The plot 500 includes an x-axis 410 corresponding to time (t) and a y-axis 420 corresponding to an output (e.g., amplitude) of a respective signal. For example, the plot 500 shows signals $s_1$ 430-1 through $s_4$ 430-4. Signals $s_1$ 430-1 and $s_2$ 430-2 are optical signals each received from a respective receiver component (e.g., $R_a$ 420-a and $R_b$ 420-b of FIG. 4) signal $s_3$ 430-3 is a signal generated based on the sum of signals $s_1$ and $s_2$, and signal $s_4$ 430-4 is a result heterodyne signal. In some embodiments, $s_1=\sin(\omega_1 t)+A$, $s_2=\sin(\omega_2 t)+B$, $s_3=s_1+s_2+C$, and $s_2=\sin(\omega_3 t-D)+E$. In the illustrative example shown in FIG. 4, $\omega_1=1$, $\omega_2=1.1$, $\omega_3=0.1$, A=1, B=3, C=2, D=30 and E=7.

Figure 6:
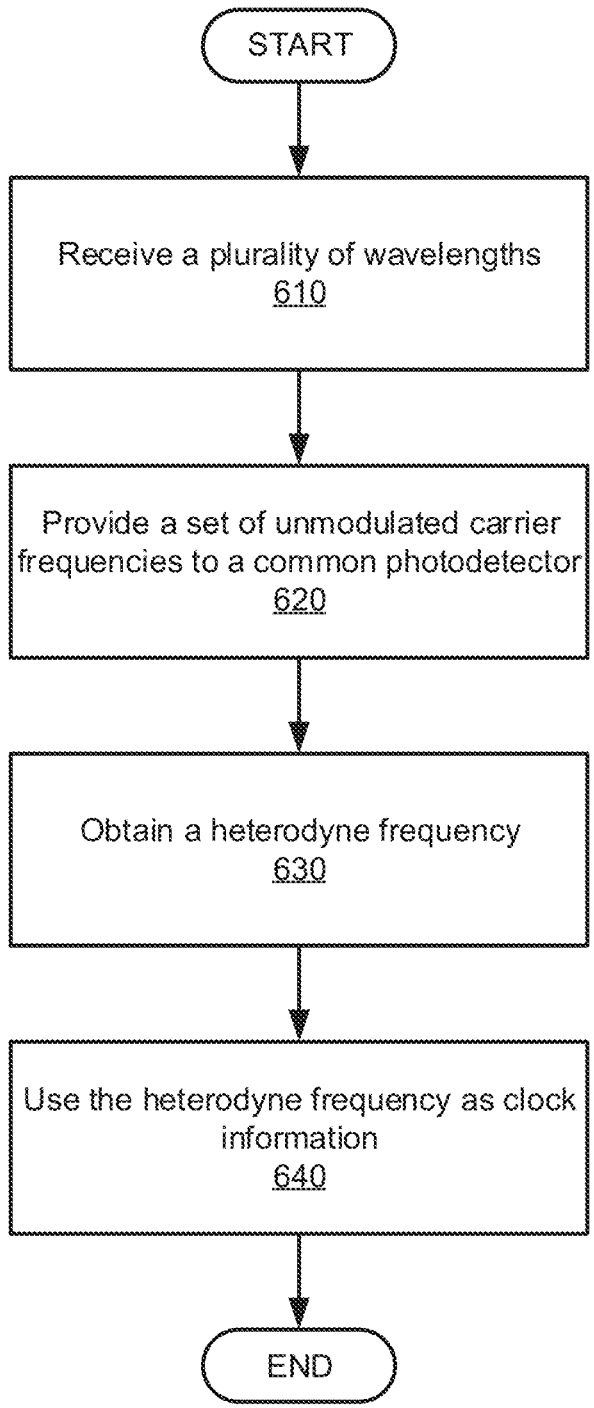
FIG. 6 is a flow diagram of a method to implement wavelength-division multiplexed links with built-in clock forwarding, in accordance with at least some embodiments.

FIG. 6 illustrates a flow diagram of a method 600 to implement wavelength-division multiplexed links with built-in clock forwarding, according to at least one example embodiment. The method 600 can be performed by processing logic comprising hardware, software, firmware, or any combination thereof. In at least one embodiment, the method 600 is performed within a receiver, such as the receiver 220 described above with reference to FIGS. 2 and 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for implementing wavelength-division multiplexed links with built-in clock forwarding are possible.

At operation 610, a plurality of wavelengths is received. For example, the plurality of wavelengths can be a plurality of transmitted wavelengths received by a receiver from a transmitter. Adjacent wavelengths of the plurality of wavelengths can be separated by a frequency spacing (e.g., fixed frequency spacing). The receiver can include a number of receiver components (e.g., filters), and the transmitter can include a number of transmitter components. Each of the receiver components can be tuned to receive a respective wavelength of the plurality of wavelengths. The plurality of wavelengths can include a set of data wavelengths ("in-bound wavelengths") corresponding to modulated carrier frequencies having respective data embedded thereon for data transmission. The plurality of wavelengths can further include a set of excess wavelengths ("out-of-bound" wavelengths) corresponding to unmodulated carrier frequencies having no data embedded thereon for data transmission. The set of data wavelengths and the set of excess wavelengths may have been generated by the transmitter such that the excess wavelengths carry clock information that can be obtained by generating a heterodyne frequency from two or more of the excess wavelengths.

At operation 620, a set of unmodulated carrier frequencies (from the set of excess wavelengths) is provided to a common photodetector. For example, the set of unmodulated carrier frequencies can be combined and impinged at a common photodetector that generates a photocurrent. In some embodiments, the set of unmodulated carrier frequencies includes a pair of unmodulated carrier frequencies.

At operation 630, a heterodyne frequency is obtained. For example, the unmodulated carrier frequencies can be converted into the heterodyne frequency at the common photodetector. In some embodiments, obtaining the heterodyne frequency includes generating a heterodyne signal having the heterodyne frequency from interference (e.g., constructive and/or destructive interference) between each unmodulated carrier frequency of the set of unmodulated carrier frequencies. For example, the heterodyne frequency can be a frequency of the AC component of the photocurrent generated by the common photodetector (e.g., sine wave)

The heterodyne frequency can have a magnitude proportional to the magnitude of the frequency spacing. In some embodiments, the heterodyne frequency has a magnitude equal to the magnitude of the frequency spacing. In some embodiments, the heterodyne frequency has a magnitude equal to at least twice the magnitude of the frequency spacing. For example, the heterodyne frequency can have a magnitude of any suitable integer multiples (e.g., octaves) of the magnitude of the frequency spacing.

At operation 640, the heterodyne frequency is used as clock information. More specifically, the heterodyne frequency is used as clock information to synchronize the receiver with the transmitter. For example, the heterodyne frequency can be sent to each receiver component of the receiver to synchronize the receiver with the transmitter. Further details regarding operations 610-640 are described above with reference to FIGS. 2-5.

Figure 7:
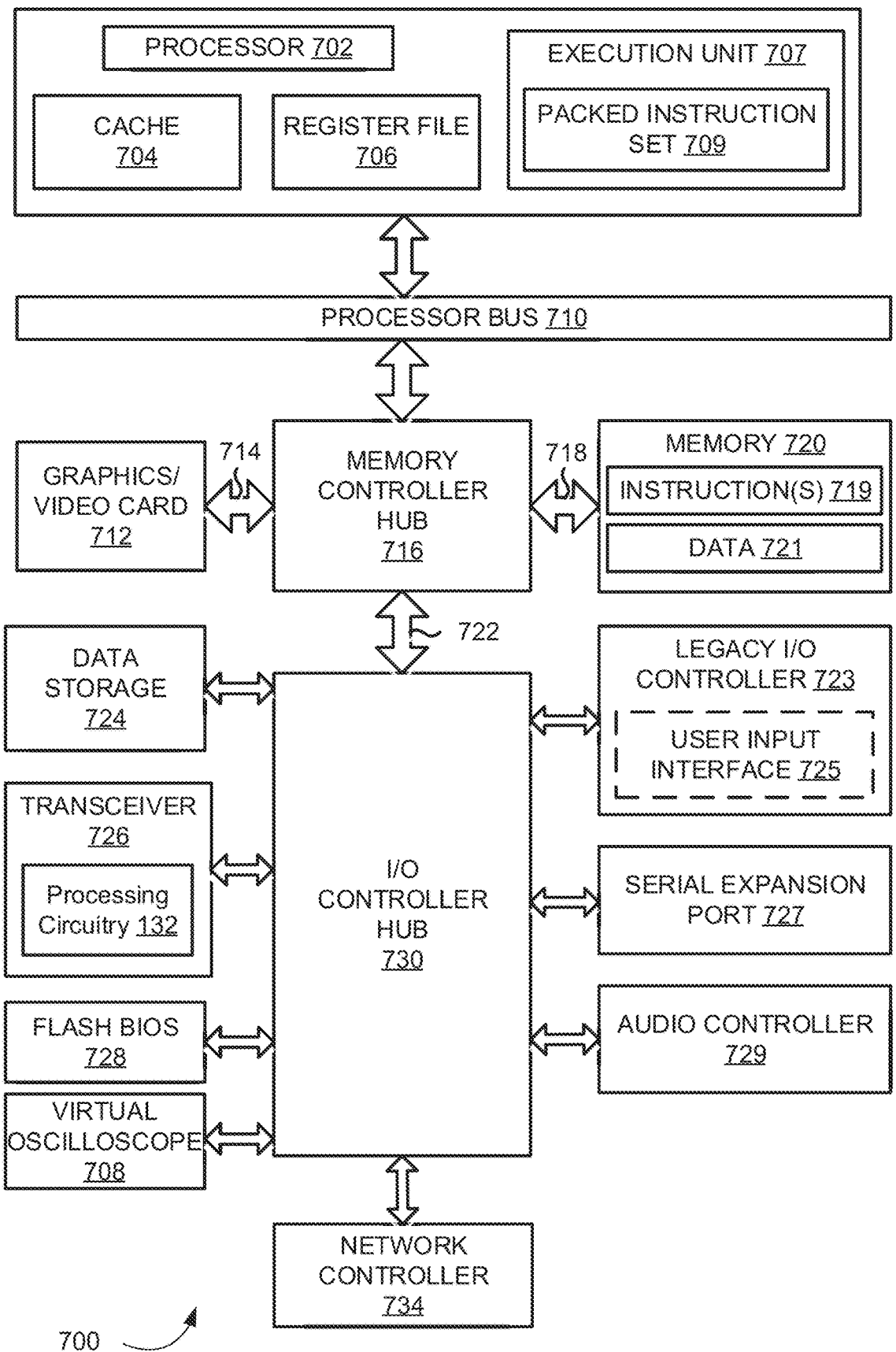
FIG. 7 illustrates an example computer system including a transceiver including a chip-to-chip interconnect, in accordance with at least some embodiments.

FIG. 7 illustrates a computer system 700 including a transceiver including a chip-to-chip interconnect, in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as processor 702 to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 602 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 610 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, execution unit 702 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through high bandwidth memory path 718 and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, a chipset, and processor 702. Examples may include, without limitation, an audio controller 729, a firmware hub ("flash BIOS") 728, a transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device. In an embodiment, the transceiver 726 includes a constrained FFE 708.

In at least one embodiment, FIG. 7 illustrates a system, which includes interconnected hardware devices or "chips" in the transceiver 726—e.g., the transceiver 726 includes a chip-to-chip interconnect including the first device 110 and second device 112 as described with reference to FIG. 1). In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof. In at least one embodiment, one or more components of system 700 are interconnected using compute express link ("CXL") interconnects. In an embodiment, the transceiver 726 can include processing circuitry 132 as described with reference to FIGS. 1 and 4. In such embodiments, the processing circuitry 132 can facilitate a method to implement wavelength-division multiplexed links with built-in clock forwarding. For example, the processing circuitry 132 can use a heterodyne signal obtained by a receiver to set a clock for synchronizing incoming data, as described with reference to FIGS. 2-6.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "receiving," "providing," "obtaining," "using," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An optical receiver comprising:
   a plurality of receiver components configured to receive a plurality of optical wavelengths of radiation, the plurality of optical wavelengths comprising a set of data wavelengths each having a modulated carrier frequency and a set of excess wavelengths each having an unmodulated carrier frequency; and
   a plurality of photodetectors, each photodetector of the plurality of photodetectors being operatively coupled to at least one receiver component of the plurality of receiver components to receive at least one optical wavelength, wherein the plurality of photodetectors comprises a common photodetector operatively coupled to at least two receiver components of the plurality of receiver components and configured to obtain a set of unmodulated carrier frequencies from the at least two receiver components, and determine clock information therefrom.

2. The optical receiver of claim 1, wherein:
   each receiver component of the at least two receiver components is tuned to receive a respective excess wavelength of the set of excess wavelengths; and
   the optical receiver is configured to determine the clock information by obtaining a heterodyne frequency from the set of unmodulated carrier frequencies.

3. The optical receiver of claim 2, wherein each wavelength of the plurality of optical wavelengths has a frequency defined by a frequency spacing, and wherein the heterodyne frequency has a magnitude proportional to a magnitude of the frequency spacing.

4. The optical receiver of claim 3, wherein the magnitude of the heterodyne frequency is equal to the magnitude of the frequency spacing.

5. The optical receiver of claim 3, wherein the magnitude of the heterodyne frequency is equal to at least twice the magnitude of the frequency spacing.

6. The optical receiver of claim 2, wherein the common photodetector is configured to output an electrical signal having the heterodyne frequency, and wherein the electrical signal corresponds to an alternating current (AC) portion of a photocurrent generated by the common photodetector.

7. A method comprising:
   receiving, by an optical receiver from an optical transmitter, a plurality of optical wavelengths of radiation, the plurality of optical wavelengths comprising a set of data wavelengths each having a modulated carrier frequency and a set of excess wavelengths each having an unmodulated carrier frequency;
   providing, by the optical receiver, a set of unmodulated carrier frequencies from the set of excess wavelengths to a common photodetector; and
   determining, by the optical receiver at the common photodetector, clock information from the set of unmodulated carrier frequencies.

8. The method of claim 7, wherein determining the clock information comprises obtaining a heterodyne frequency from the set of unmodulated carrier frequencies.

9. The method of claim 8, wherein each optical wavelength of the plurality of optical wavelengths has a frequency defined by a frequency spacing, and wherein the heterodyne frequency has a magnitude proportional to a magnitude of the frequency spacing.

10. The method of claim 9, wherein the magnitude of the heterodyne frequency is equal to the magnitude of the frequency spacing.

11. The method of claim 9, wherein the magnitude of the heterodyne frequency is equal to at least twice the magnitude of the frequency spacing.

12. The method of claim 8, wherein the common photodetector is to output an electrical signal having the heterodyne frequency, and wherein the electrical signal corresponds to an alternating current (AC) portion of a photocurrent generated by the common photodetector.

13. A system comprising:
   an optical transmitter comprising a plurality of transmitter components configured to:
      receive a plurality of optical wavelengths of radiation from a multiple wavelength generator; and
      generate a plurality of transmitted wavelengths from the plurality of optical wavelengths, the plurality of transmitted wavelengths comprising a set of data wavelengths each having a modulated carrier frequency and a set of excess wavelengths each having an unmodulated carrier frequency; and
   an optical receiver operatively coupled to the optical transmitter via an optical channel, the optical receiver comprising:
      a plurality of receiver components configured to receive the plurality of transmitted wavelengths; and
      a plurality of photodetectors, each photodetector of the plurality of photodetectors being operatively coupled to at least one receiver component of the plurality of receiver components to receive at least one transmitted wavelength, wherein the plurality of photodetectors comprises a common photodetector operatively coupled to at least two receiver components of the plurality of receiver components and configured to obtain a set of unmodulated carrier frequencies from the at least two receiver components, and determine clock information therefrom.

14. The system of claim 13, wherein:
   each receiver component of the at least two receiver components is tuned to receive a respective excess wavelength of the set of excess wavelengths; and
   the optical receiver is configured to determine the clock information by obtaining a heterodyne frequency from the set of unmodulated carrier frequencies.

15. The system of claim 14, wherein each optical wavelength of the plurality of optical wavelengths has a frequency defined by a frequency spacing, and wherein the heterodyne frequency has a magnitude proportional to a magnitude of the frequency spacing.

16. The system of claim 15, wherein the magnitude of the heterodyne frequency is equal to the magnitude of the frequency spacing.

17. The system of claim 15, wherein the magnitude of the heterodyne frequency is equal to at least twice the magnitude of the frequency spacing.

18. The system of claim 14, wherein the common photodetector is to output an electrical signal having the heterodyne frequency, and wherein the electrical signal corresponds to an alternating current (AC) portion of a photocurrent generated by the common photodetector.

19. The system of claim 13, wherein the multiple wavelength generator operates in at least one of an original band ("O-band") or a conventional band ("C-band").

20. The system of claim 13, wherein the multiple wavelength generator comprises a laser.

* * * * *